United States Patent
Narayanan et al.

(10) Patent No.: US 11,144,673 B2
(45) Date of Patent: Oct. 12, 2021

(54) CENTRALIZED SYSTEM FOR SENSITIVE DATA CONVERSION

(71) Applicant: Bank of America Corporation, Charlotte, NC (US)

(72) Inventors: Rajesh Narayanan, Chennai (IN); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 167 days.

(21) Appl. No.: 16/374,918

(22) Filed: Apr. 4, 2019

(65) Prior Publication Data

US 2020/0320223 A1 Oct. 8, 2020

(51) Int. Cl.
| | |
|---|---|
| G06F 21/62 | (2013.01) |
| G06F 16/903 | (2019.01) |
| H04L 29/06 | (2006.01) |
| G06F 16/25 | (2019.01) |

(52) U.S. Cl.
CPC ........ *G06F 21/6254* (2013.01); *G06F 16/258* (2019.01); *G06F 16/90344* (2019.01); *H04L 63/0209* (2013.01); *H04L 63/0414* (2013.01)

(58) Field of Classification Search
CPC ............. G06F 21/6254; G06F 21/6245; G06F 16/258; G06F 21/604; G06F 16/90344; G06F 16/93; G06Q 20/383; H04L 9/0643; H04L 63/0209; H04L 63/0414; H04L 63/0227

See application file for complete search history.

(56) References Cited

U.S. PATENT DOCUMENTS

| | | |
|---|---|---|
| 6,981,141 B1 | 12/2005 | Mahne et al. |
| 7,694,134 B2 | 4/2010 | Witt et al. |
| 7,792,300 B1 | 9/2010 | Caronni |
| 7,870,614 B1 | 1/2011 | Duhaime et al. |
| 8,209,764 B2 | 6/2012 | Duhaime et al. |

(Continued)

OTHER PUBLICATIONS

"An Introduction to Data Masking," https://resources.infosecinstitute.com/an-introduction-to-data-masking/, Apr. 2, 2013.

(Continued)

*Primary Examiner* — Christopher A Revak
(74) *Attorney, Agent, or Firm* — Weiss & Arons LLP; Michael A. Springs, Esq.

(57) ABSTRACT

A method for converting data via a centralized application programming interface ("API") is provided. The method may include retrieving data files from two or more data repositories and transmitting the data files to the centralized API. For each of the data files, the method may include selecting a conversion application and executing the conversion application to convert the data files into secure data files. The executing may include converting sensitive data strings into fictional data strings. Each of the sensitive data strings may include a first sub-set of characters and a second sub-set of characters. The converting may include, for each of the sensitive data strings, replacing the first sub-set of characters with a third sub-set of characters and maintaining the second sub-set of characters. Following the converting, the method may include transmitting the secure data files to an external network.

19 Claims, 5 Drawing Sheets

(56) References Cited

U.S. PATENT DOCUMENTS

| | | | |
|---|---|---|---|
| 8,458,487 B1* | 6/2013 | Palgon | H04L 63/0807 |
| | | | 713/185 |
| 8,544,110 B2 | 9/2013 | Duhaime et al. | |
| 8,751,450 B1* | 6/2014 | Gaonkar | G06F 11/3495 |
| | | | 707/634 |
| 8,930,381 B2* | 1/2015 | Raghunathan | G06F 21/6254 |
| | | | 707/756 |
| 8,984,656 B1 | 3/2015 | Duhaime et al. | |
| 9,208,491 B2 | 12/2015 | Spies et al. | |
| 9,223,995 B1* | 12/2015 | Lavinio | H04L 63/0421 |
| 9,245,149 B1* | 1/2016 | Chereshnev | G06F 21/6245 |
| 9,256,735 B2* | 2/2016 | Stute | G06F 21/55 |
| 9,298,941 B2* | 3/2016 | Stofberg | G06F 11/1453 |
| 9,373,003 B2 | 6/2016 | Branton et al. | |
| 9,460,298 B1 | 10/2016 | Duhaime et al. | |
| 9,686,251 B2 | 6/2017 | Marinkovic et al. | |
| 9,858,436 B2 | 1/2018 | Arnold et al. | |
| 9,875,376 B1 | 1/2018 | Duhaime et al. | |
| 9,942,044 B2 | 4/2018 | Sullivan | |
| 10,146,957 B1 | 12/2018 | Duhaime et al. | |
| 10,147,089 B2 | 12/2018 | Powell et al. | |
| 2011/0153689 A1* | 6/2011 | Hall | G06F 12/0253 |
| | | | 707/813 |
| 2011/0173676 A1* | 7/2011 | Peckover | G16H 40/67 |
| | | | 726/3 |
| 2014/0137262 A1* | 5/2014 | Stofberg | G06F 11/1453 |
| | | | 726/26 |
| 2016/0335397 A1* | 11/2016 | Blum | G06F 21/6254 |
| 2017/0316479 A1* | 11/2017 | Kurian | G06Q 20/385 |
| 2018/0359223 A1* | 12/2018 | Maier | H04L 63/1441 |
| 2019/0370494 A1* | 12/2019 | Kurian | G06F 40/295 |
| 2020/0311304 A1* | 10/2020 | Parthasarathy | G06F 11/3006 |
| 2020/0327252 A1* | 10/2020 | McFall | G06F 21/602 |

OTHER PUBLICATIONS

"Difference Between JSON and XML," https://www.geeksforgeeks.org/difference-between-json-and-xml/, Retrieved on Feb. 19, 2019.
"Tokenization (data security)", https://en.wikipedia.org/wiki/tokenization_(data_security), Wikimedia Foundation, Inc., Jan. 17, 2019.

* cited by examiner

CENTRALIZED SYSTEM FOR SENSITIVE DATA CONVERSION

FIELD OF TECHNOLOGY

Aspects of the invention relate to apparatus and methods for centralizing the conversion of sensitive data for the use in testing environments.

BACKGROUND OF THE DISCLOSURE

Large entities typically maintain a number of databases. Each database within the entity's system may store data associated with a line of business within the entity or store data for a specific purpose. For example, third party platforms routinely utilize stored data from an entity's internal system for data-testing and data-analysis.

Some entities leverage their data by allowing third parties to access at least some of their data. These third parties may include database management systems ("DBMS"), financial management systems, automated business processes and software as a service ("SAAS") applications, as well as any other suitable external platform.

These third party platforms may generate applications to access and utilize the data from the internal systems. The applications may communicate with the databases via internal service Application Programming Interfaces ("API's") for retrieval of the data. Each database may be accessed via an API. The API may be configured to manage and handle the data within its database.

Each API may need to mask all sensitive data, such as personal and private data, from the database prior to being accessed by third party platforms. Since the data from each data repository is converted using a different API, a first set of converted data may not be in synchronization with a second set of converted data converted using a first API and a second API. This may cause numerous errors in a testing and/or analysis environment.

Furthermore, the converted fictional data may have reduced or insignificant meaning which enables preventing any outside source from accessing the sensitive data thereby securing the internal network. However this disables testing services, analysis services and the internal network, the ability to have some meaning to the data.

It would be desirable, therefore, to have systems and methods to centralize the process for converting sensitive data from a plurality of data repositories.

It would further be desirable to have systems and methods to create fictional data that includes a portion of intelligence within the fictional data meaningful to users of the system.

SUMMARY OF THE DISCLOSURE

A method for converting data via a centralized application programming interface ("API") is provided. The method may be performed by one or more non-transitory computer-readable media storing computer-executable instructions which, when executed by a processor in a computerized device, perform the method for converting data.

The method may include retrieving data files from two or more data repositories within an internal network. The data files may be configured for use in an external network. Each of the data files may include non-sensitive data and sensitive data. Each of the sensitive data and non-sensitive data may include one or more strings of characters.

The method may further include transmitting the data files to the centralized API. In response to the receipt of the data files, the method may further include determining, via the centralized API, a file-type for each of the data files.

For each of the data files, the method may include selecting a conversion application from a plurality of conversion applications. Each of the conversation applications may support a file-type. The selected conversion application for each data file may support the file-type of the data file.

The method may further include executing the selected conversion applications to convert the data files into secure data files. The executing may include converting the sensitive data strings into fictional data strings. Each of the sensitive data strings may include a first sub-set of characters and a second sub-set of characters. A number of characters in each of the sensitive data strings may be equal to the number of characters included in each of the equivalent fictional data strings.

The converting may include, for each of the sensitive data strings, replacing the first sub-set of characters included in the sensitive data string with a third sub-set of characters. The converting may also include maintaining the second sub-set of characters included in the sensitive data string. The fictional data string may include the same number of characters as the original data string.

Following the converting, the method may include transmitting the secure data files to the internal API of the internal network. The method may further include transmitting the secure data files from the internal API within the internal network to the external network.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

A centralized data conversion architecture is provided. The architecture may include one or more external networks in communication with an internal network. The communication may be performed via a communication platform. The communication may be for the purpose of a retrieval of data.

The external networks may be a third party retrieving data from an internal network for the purpose of data-testing and/or for the purpose of data-analysis. Data testing and analytics may provide external entities with a variety of uses. Financial institutions may analyze data to determine withdrawal and spending patterns in order to prevent fraud. Healthcare organizations may analyze data for effectiveness of treatments. Third party marketers and consultants may use internal data for development. Outside contractors may be building and designing a database for an enterprise and may need to test the database environment without having access to the sensitive information.

All data retrieved from internal networks may entail disassociating the data from the internal network to secure all internal data. By disassociating the data, all relationships, pointers and links may be deleted from the data being used in the external network.

The architecture may include a first firewall. The first firewall may reside between the communication platform and the external platforms. The architecture may include a second firewall. The second firewall may reside between the communication platform and the internal network.

The internal network may include one or more internal application programming interfaces ("API"). The internal network may also include a centralized data conversion API.

The one or more internal API's may operate as a gateway to the centralized data conversion API. The centralized data conversion API may be a central API configured to convert sensitive data to fictional data. The fictional data may be transmitted to the external networks for testing and/or analysis. The centralized data conversion API may be configured to handle the converting of the data from all the internal data repositories. This may enable a uniform conversion for all the data. A uniform conversion may enhance the accuracy and the clarity of the data to be tested.

The internal network may further include two or more data repositories. The data repositories may be configured to store data associated with an entity of the internal network. The data may be accessed via the one or more internal API's. The data may include one or more data files. Each data file may include field names and value pairs. Some values may include non-sensitive data. Some values may include sensitive data. The non-sensitive data may be displayed as a non-sensitive data string of characters. The sensitive data may be displayed as a sensitive data string of characters. The sensitive data strings may require being converted prior to being transmitted to an external network.

The architecture disclosed herewith may be configured to convert and de-sensitize all the sensitive data strings, within the centralized data conversion API, prior to being disclosed in an external environment. Thus, prior to a transmission of data to one or more of the external networks, the one or more internal API's may be configured to retrieve the data from the data repositories to be de-sensitized.

When the one or more internal API's retrieve the data from the data repositories, the one or more internal API's may be configured to disassociate the data from the internal network. This may prevent any external network from tracking a source of the retrieved data files. The internal API's may mask and delete personal identifiers associated with the data files to further provide data privacy protection.

Furthermore, disassociating the data may enable the method to be implemented with any one or more internal networks at a lower cost and at a lower capacity. As a result, the data may be less cumbersome, thereby reducing the amount of memory required during execution of the conversion and while transferring the data to the external environment. Furthermore, masking all personal information within the data files, may automatically reduce the cost of handling and managing of the masked data in an external environment because the de-sensitized data, disassociated from the internal network, may not entail advanced levels of authentication and security.

Following the retrieval of the data, the internal API's may transmit the data to the centralized data conversion API to handle the conversion of the sensitive data strings.

In response to the receipt of the data, the centralized data conversion API may be configured to determine a file-type for each data file. The centralized data conversion API may be configured to execute a conversion application for each different file-type. Each conversion application may run a conversion algorithm. For example, if the data file is a JavaScript Object Notation ("JSON") file, the centralized data conversion API may execute a JSON conversion algorithm for converting the data. If the file is an Extensible Markup Language ("XML") file, the centralized data conversion API may execute an XML conversion algorithm for converting the data.

The centralized data conversion API may use a variety of conversion algorithms. The conversion algorithm may be a hashing algorithm. The conversion may be an encryption algorithm. The conversion algorithm may be a shuffle algorithm. The conversion algorithm may be a random number algorithm. The conversion algorithm may be a fixed-character algorithm and/or a fixed-numeric algorithm. The conversion algorithm may be a substitution algorithm or any other known masking algorithms.

Each conversion application may be configured to convert the data into secure data. The converting may include converting the sensitive data strings into fictional data strings. Each converted fictional data string may be a unique string of characters. This may eliminate the chance of prediction of a string of characters by any unknown person. Furthermore, each of the equivalent fictional data strings may include the same number of characters as the original data string.

In some embodiments, when one or more data files include the same user, the centralized data conversion API may be configured to determine the fields in each file that may be associated with the user and create identical fictional data strings for each matching field in each file. For example, user 'A' may have two separate profiles in two different data repositories within the same entity. One profile may be associated with one area of business within the entity. A second profile may be associated with a second area of business within the entity. The data files transmitted to the centralized data conversion API may include both profiles associated with the same user. When the data files are received at the centralized data conversion API, the API may determine that there may be more than one set of data for the same user. In this example, the conversion algorithms executed may be configured to create the same fictional data string for each set of fields that are the same in both profiles associated with user 'a'. This centralized system creates a uniform and synchronized set of data that may be used in testing and analytical environments and enables a more accurate data set when all data files can be converted from a centralized API.

Each of the sensitive data strings may include a first sub-set of characters and a second sub-set of characters. The converting may include, for each of the sensitive data strings, replacing the first sub-set of characters included in the sensitive data string with a third sub-set of characters. The converting may also include maintaining the second sub-set of characters included in the sensitive data string. The second sub-set of characters from the sensitive data string may be indicative of at least one of a user region, user birthplace and user gender. The third sub-set and the maintained second sub-set may make up the fictional data string.

Typically, masking data obscures sensitive data by replacing the sensitive data with realistic, but not real data. This may enable protecting the data and at the same time ensuring that the data is testable and valid. According to embodiments of the invention, maintaining the second sub-set of indicative characters within the equivalent converted fictional data string may ensure that the data is testable and valid and furthermore may provide intelligence to the data that may be useful for users of the system but at the same time may be useless to an outsider and/or attempted hacker. For example, a client associated with the internal network may have included within his profile, a phone number. The first three digits of the phone number may reveal the city of residence of the client. The knowledge of a city of residence in a testing/analytical environment may enhance the analysis and/or testing without compromising security.

In another example, when converting a user's social security number, a sub-set of the characters may be maintained within the equivalent fictional data string because the sub-set of characters may have a recognized meaning based on government standards. The first three digits of an individual's social security number, according to government standards, are linked to the individual's birthplace.

In another embodiment of the invention, the centralized data conversion API may be configured to convert the second sub-set of characters to a pre-determined set of characters. For example, the first three digits of a phone number may reveal the city of residence of the client. According to this embodiment, each area code may be assigned its own, distinct, set of three digits that is meaningless to anyone outside of the network. For example, when converting a telephone number, any area code equal to '323,' may be replaced with '765.' This replacement, as well as all other pre-determined replacements, may be stored in a list in a data repository within the internal network. This list may be encrypted and transmitted to the external network that is receiving the data for use along with the data for testing.

Following the conversion, the centralized data conversion API may transmit the secure data to the internal API. The secure data may include the data files including the non-sensitive data and the converted fictional data. The internal API may be configured to transmit, via the communication platform, the secure data to the one or more external networks.

In some embodiments, the secure data may be transmitted externally and may be stored in an external database.

Sensitive data may include personal information associated with the entity. Sensitive data may be associated with employers and/or employees of the entity and clients associated with the entity. Personal information, according to the United States legal fields are either personally identifiable information ("PII"), or sensitive personal information ("SPI"). One or more of a social security number, passport number, a credit-card number, a user's salary, a birth-date, home address, e-mail address, telephone number and genetic information, may all be included in the category of personal information.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
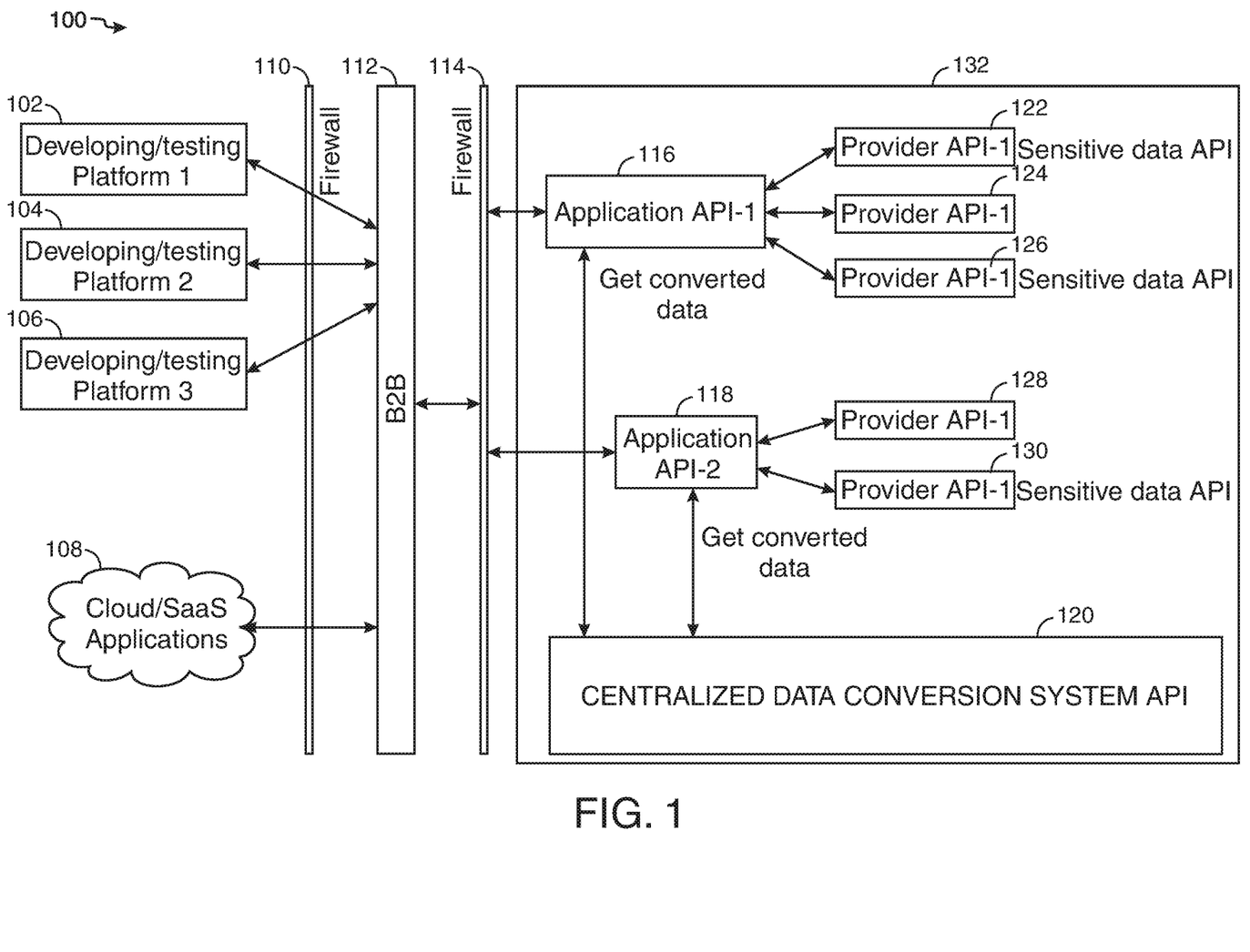
FIG. 1 shows an illustrative architecture in accordance with principles of the invention.

FIG. 1 shows an illustrative architecture of a centralized data conversion system 100. Centralized data conversion system 100 includes an internal network 112 and a plurality of external networks 102, 104, 106 and 108.

External network 102 is a first developing/testing platform. External network 104 is a second developing/testing platform. External network 106 is a third developing/testing platform. External network 108 is a cloud application and/or a Software as a Service ("SaaS") Application. External networks 102-108 are a plurality of networks. Each of these networks may be in communication with internal network 132 via communication platform 112. The communication may be used for retrieval of data for use in a data-testing environment. The communication may be used for retrieval of data for use in a data-analytical environment. The communication may be used for retrieval of data for use in a hardware and/or software development environment.

The data being transmitted to the external networks may entail additional processing to ensure that the security and privacy of the internal data does not leak out of the system to any one or more of the external networks. Firewall 110 may be an added layer to the security within the communications and to the data being passed between the external networks 102-108 and the internal network 112.

Internal network 132 may include, as a part of the network, application API's 116 and 118. Internal network 132 may also include, as a part of the network, provider-API's 122, 124, 126, 128 and 130. These provider API's may be linked to a plurality of data repositories storing data associated with the internal network. This data may be used by the external networks for testing and/or analytics.

Firewall 114 may reside between the internal network 132 and API's 116 and 118. Both API's 116 and 118 may be linked to a centralized data conversion system API 120. Centralized data conversion API 120 may be a centralized API configured to handle the conversion of all sensitive data retrieved by the API's 122-130 from the plurality of data repositories. Centralized data conversion system API 120 may be configured to determine file/format types associated with each data file and execute an appropriate conversion algorithm for each file/format type.

The converted data from the centralized data conversion system API may be transmitted back to API's 116 and/or 118 and then passed through firewall 114 and 110, prior to being transmitted to the one or more external networks 102-108.

Figure 2:
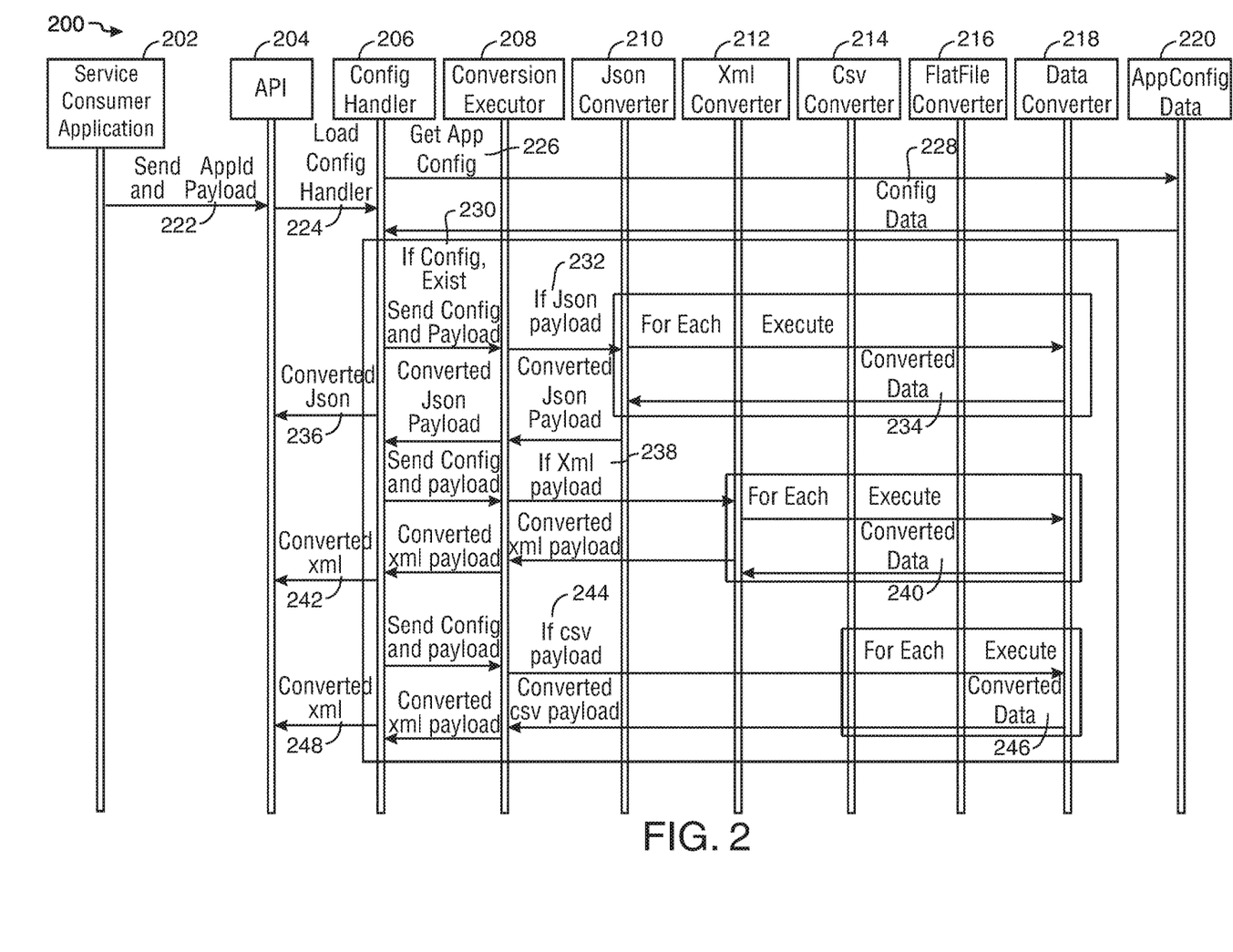
FIG. 2 shows an illustrative flow diagram in accordance with principles of the invention.

FIG. 2 shows an illustrative flow chart 200 of an external application using the centralized data conversion system in accordance with an embodiment of the invention. The centralized data conversion system may be a system that may be used by many external systems. Any one or more third-party providers may integrate this system for de-sensitizing personal data. Each provider may perform a one-time initial application configuration to configure the data in accordance with their respective requirements.

Line 202 represents a service consumer application. Line 204 represents an application programming interface ("API"). The API may be linked to an internal network. Line 206 represents a configuration handler. Line 208 represents a conversion executor. Line 210 represents a JSON converter. Line 212 represents an XML converter. Line 214 represents a Comma-Separated Values ("CSV") converter. Line 216 represents a flat file converter. Line 218 represents a data converter. Line 220 represents an application data configuration.

Service consumer application 202 may transmit an application ID and payload to the centralized data conversion system 200, at step 222. The payload may include data-sets that include personal information that may need to be de-sensitized. The data may need to be de-sensitized in order to be securely used in an external environment without the concern of a security breach.

When the application ID and payload hit the API 204, API 204 may load configuration handler 206, at step 224. When configuration handler 206 is invoked, configuration data relating to application 202 may be retrieved from application configuration data 220, at step 226. The configuration data may be a set of instructions. The instructions may include information associated with what may be determined to be sensitive and/or what may not be determined to be sensitive.

An application associated with the application ID may have more than one payload configuration. Payload types and the types of conversion algorithms may be configured in the initial configuration. A number of fields may also be configured in the initial configuration.

Following retrieval of configuration data, the configuration data may be returned to configuration handler 206, at step 228. API 204 may validate, at step 230, that the configuration data exists. Following validation of the configuration data, the configuration data and the payload may be transmitted to conversion executor 208, as shown at step 230.

Conversion executor 208 may be configured to determine the file-type of each of the data-sets. Based on the file-type of the data set, the conversion executor 208 may transmit the data set to its corresponding file-type converter.

In one embodiment, an initial conversion may be performed for each data-set, at the corresponding file-type converter. In such an embodiment, following the initial conversion, each data-set may be transmitted to data converter 218 for an additional conversion performed on all data-sets.

In another embodiment, each data-set may be transmitted to the appropriate file-type converter which may serve as a gateway to data converter 218. In this embodiment, data converter 218 may be configured to apply the conversion algorithm to each data-set based on the file-type of the data-set and further based on the data converter gateway it may have been received from.

Conversion executor 208 may perform a file-type check. At step 232, if the data-set is a JSON-type data-set, the data-set may be transmitted to JSON converter 210 for conversion. At step 234, the JSON converted data may be transmitted to data converter 218. If the data-set is not a JSON-type data-set, the conversion executor may determine if it is an XML-type data-set, as shown at step 238. If the data-set is determined to be an XML-type data-set, the data-set may be transmitted to XML converter 212 for conversion. Following conversion, the data may be transmitted to data converter 218, at step 240. If the data-set is determined not to be an XML-type data-set, conversion executor 208 may determine the data-set to be a CSV-type data-set. At step 244, the data-set is determined to be a CSV-type data-set and may be transmitted to CSV converter 214 for conversion. Following conversion, the data may be transmitted to data converter 218, as shown at step 246.

For each data-set, data converter 218 may apply a second, and more generalized conversion algorithm on the data-set. This may add an additional level of security to the sensitive data. In a different embodiment, for each data-set, data converter 218 may apply the appropriate file-type converter to convert all sensitive data to fictional data, based on the data converter gateway from which it may have been received.

Each converted JSON data-set may be transmitted back to the API, as shown at step 236. Each converted XML data-set may be transmitted back to API 204, as shown at step 242. Each converted CSV data-set may be transmitted back to API 204, as shown at step 248.

The API 204 may be configured to transmit to the service consumer application 202, the payload including the de-sensitized fictional data.

Figure 3:
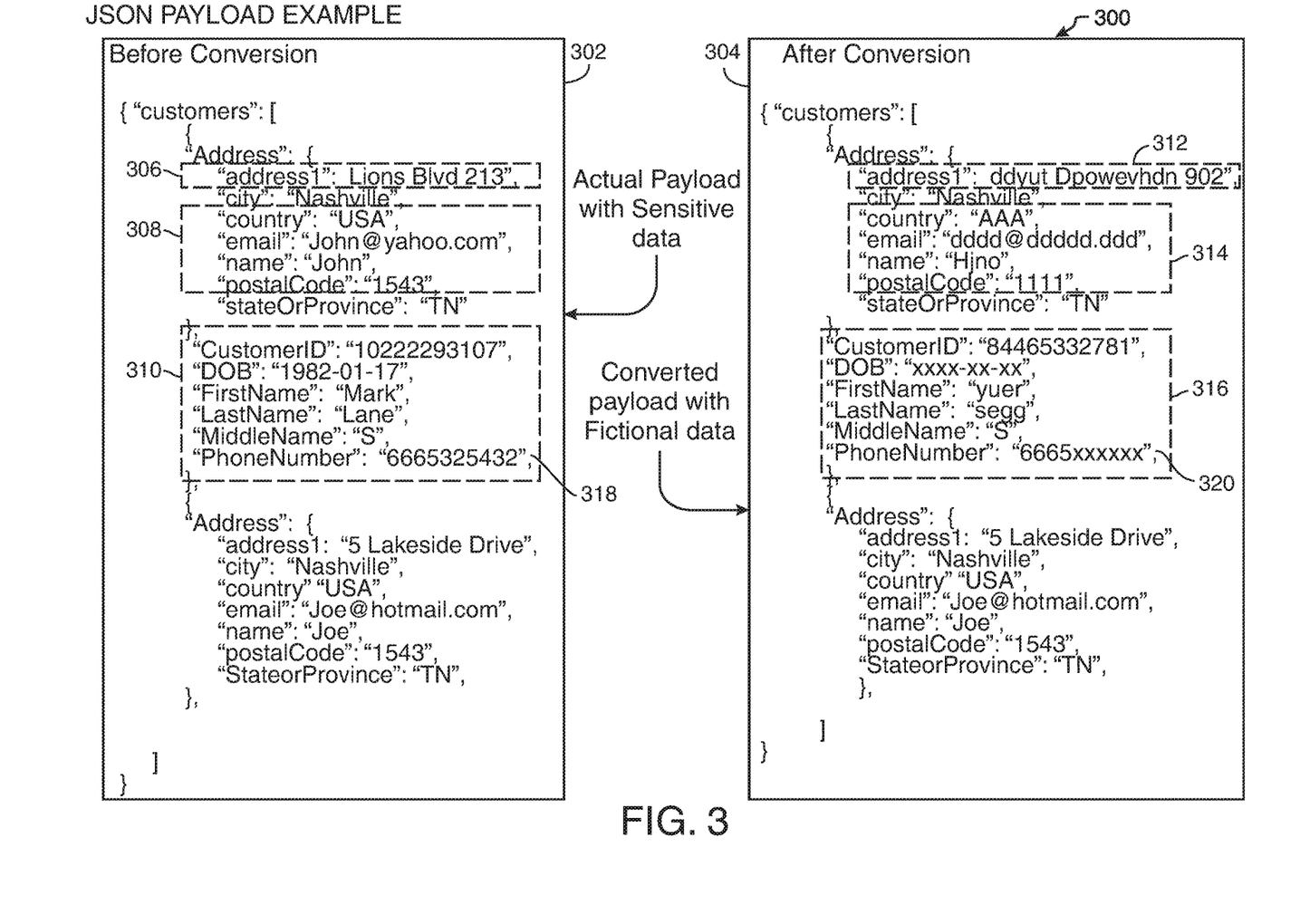
FIG. 3 shows an illustrative exemplary diagram in accordance with principles of the invention.

FIG. 3 shows an illustrative example of two JSON data files in a centralized data conversion system. JSON data file 302 is a JSON file that may include both sensitive and non-sensitive data. Data file 302 may be a data file prior to being de-sensitized. JSON file 304 may be a data file that includes a converted version of the sensitive data from JSON file 302. JSON data file 302 may include a plurality of field names and corresponding values. Some of the data stored as the value may include personal information. Some of the data stored as the value may include information that is not personal and/or sensitive. Each value may include a string of characters.

Before these files are transmitted to an external environment, the personal information may need to be masked. In this exemplary diagram, the values within display-box 306, 308 and 310 may need to be masked. These values may include personal and/or private information. These values may each be a sensitive data string. Each sensitive data string may be a string of a number of characters.

JSON file 302 may be transmitted to the centralized data conversion application for masking these sensitive data strings. In accordance with embodiments of the invention, the sensitive data strings may be masked but some intelligence may be maintained within one or more of the masked data strings.

JSON file 304 may include the data from JSON file 302 where the sensitive data has been converted into fictional data. The data in box 312 may correspond to the data in box 306. The data in box 314 may correspond to the data in box 308. The data in box 316 may correspond to the data in box 310. Box 312 may include an address field.

For each string of characters being converted in accordance with embodiments of the invention, the number of characters in each converted data string may be equal to the number of characters in the corresponding equivalent sensitive data string. The conversion algorithm that may be executed may be the same algorithm for each sensitive data string. The conversion algorithm that may be executed may be different for each sensitive data string.

In this exemplary diagram, the conversion algorithm executed may not be the same algorithm for each sensitive data string. In fact, for each sensitive data string, a different conversion algorithm may be performed. The conversion algorithm performed on the address field in box 306 may be a random-type conversion algorithm. A fixed-character type algorithm may be executed on the country field and email field, as shown in box 314. A shuffle type algorithm may be performed on the name field and a fixed-numeric type algorithm may be performed on the postal code, as shown in box 314. A random type algorithm may be performed on the 'customerID' field and a fixed-character type algorithm may be performed on the 'date-of-birth' field, as shown in box 316. A random type algorithm may be performed on the first name and last name fields, as shown in box 316.

The phone number field 318 in box 310, prior to conversion, may include the string of characters—'6665325432.' The conversion algorithm performed may be a fixed-character type algorithm. In this example, a sub-set of the characters are maintained in the converted string of characters 320, as shown in box 316. In the equivalent converted string of characters 320 the first four characters are maintained and the remaining characters are converted to a fixed-character string. These first four characters may be associated with a location of a customer. These maintained sub-sets of characters provide intelligence to the converted string of characters thereby enhancing the performance of analysis and testing of the data.

In some embodiments, the same conversion algorithm may be performed on each sensitive data string within the data file. In other embodiments, different algorithms may be performed for each of the sensitive data strings. The centralized conversion API, in either embodiment, may convert the sensitive data to fictional data while maintaining the same character length for each string of characters.

Figure 4:
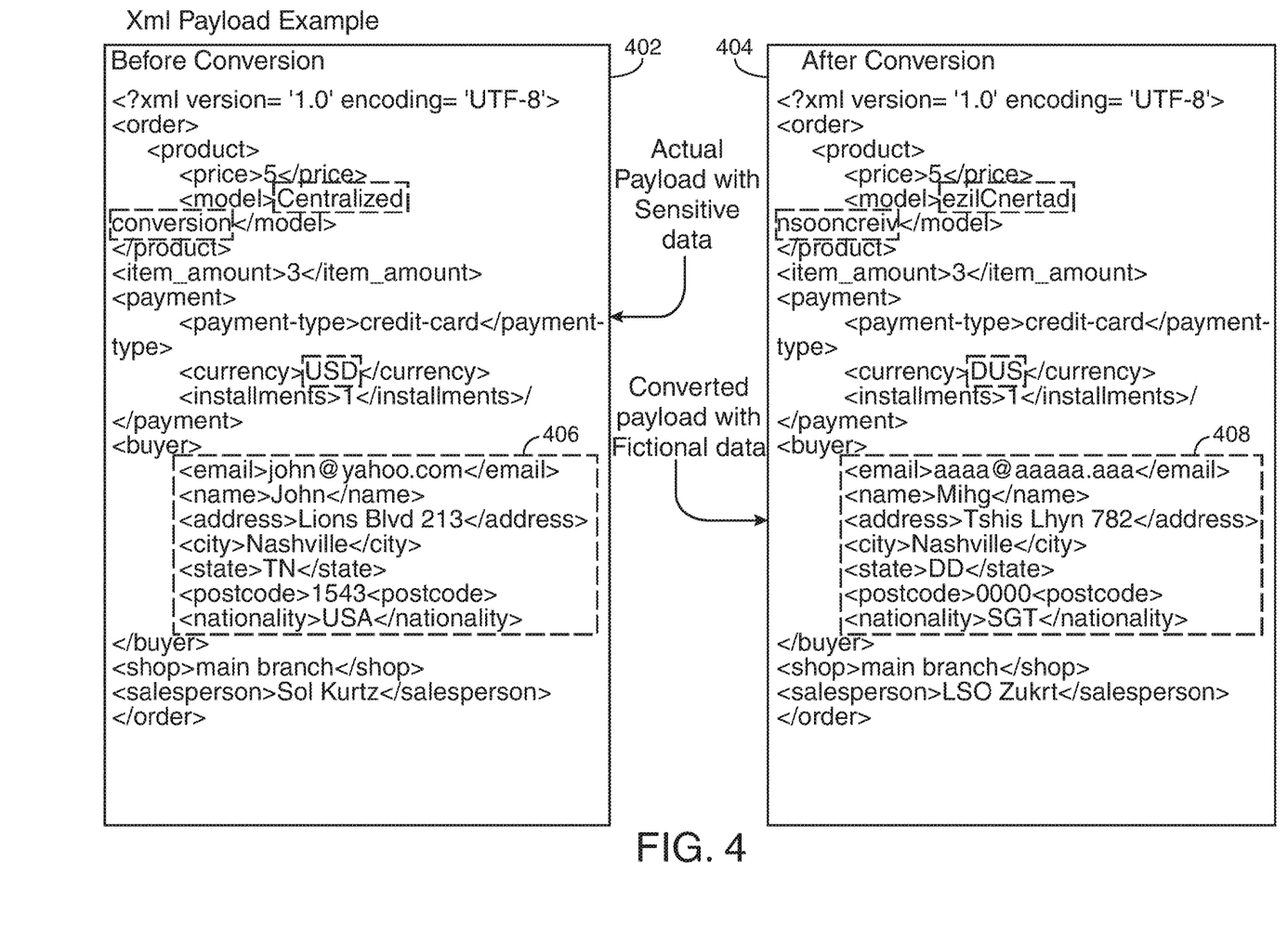
FIG. 4 shows another illustrative exemplary diagram in accordance with principles of the invention.

FIG. 4 shows an illustrative example of an XML data file in a centralized data conversion system. XML file 402 may be a data file that includes both sensitive and non-sensitive information. XML file 404 may be a data file that includes a converted version of the sensitive data from XML file 402.

The data within data file 402 may be a transaction data file associated with a transaction. The data may include profile data associated with a user of a credit card associated with the transaction. Display box 406 may include field names and values. The values may include personal information that may require masking. Display box 408 may include the data from box 406 following conversion of the sensitive data.

In this exemplary diagram, each sensitive data string may be converted using a different conversion algorithm. The value within the 'email' tag may be converted using a fixed-character conversion algorithm. The value within the 'name' tag and the 'address' tag may be converted using a random-character conversion algorithm. The value within the 'city' tag, according to this example, may not be considered sensitive data and may not be converted. The value within the 'state' tag may be converted using a fixed-character conversion algorithm. The value within the 'postcode' tag may be converted using a fixed-numeric conversion algorithm. The value within the 'nationality' tag may be converted using a random-character conversion algorithm.

Figure 5:
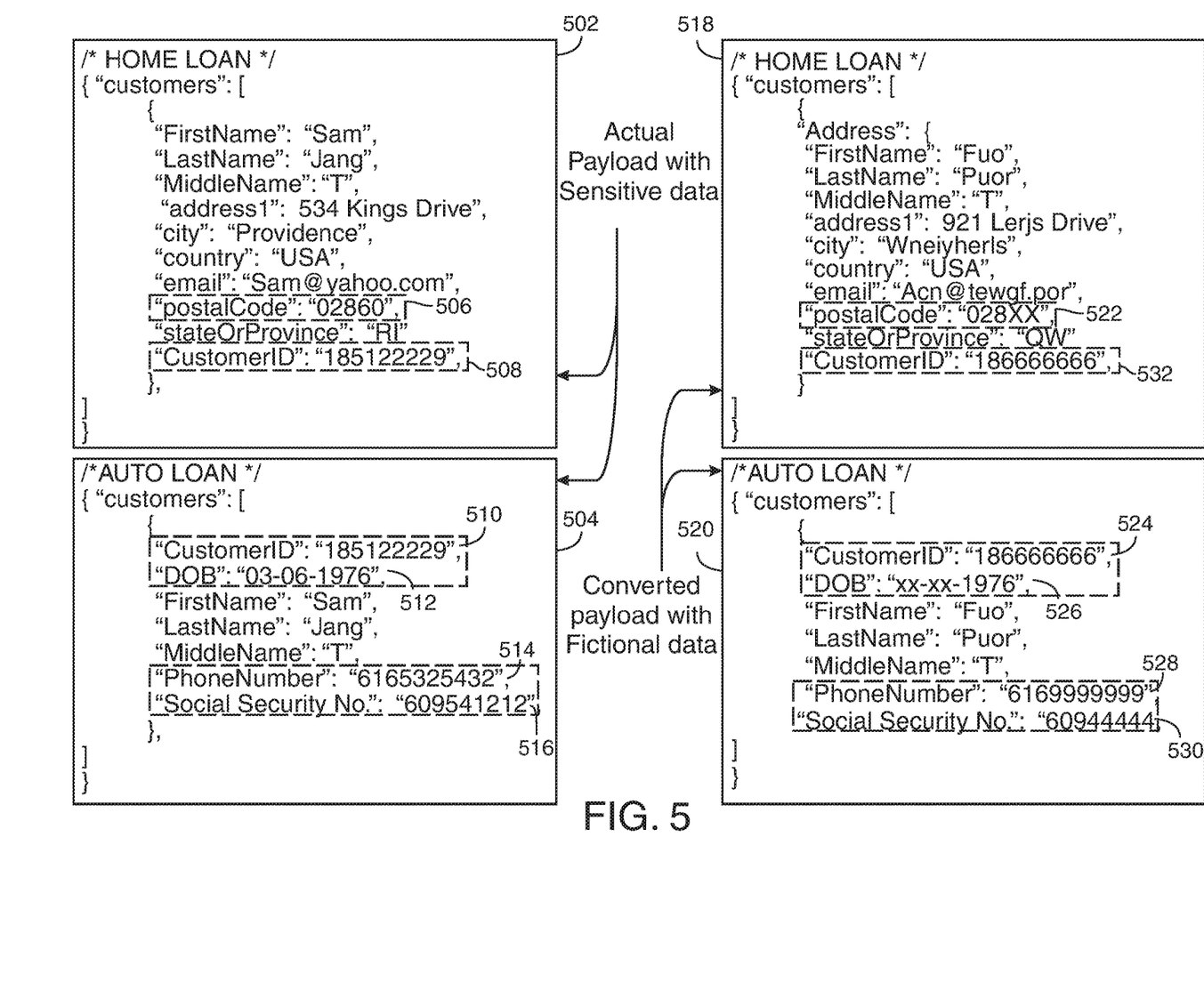
FIG. 5 shows another illustrative exemplary diagram in accordance with principles of the invention.

FIG. 5 shows another illustrative example of a JSON data file in a centralized data conversion system. The illustrated data may be realistic data from a production environment to be used for development and testing. By using this data, the testing can be as near to production as possible. The data may be masked and then stored in a separate database external to the production environment.

Data file 502 may be a JSON data file from a first database within a financial institution. The first database may store data associated with customers that may have taken a loan to purchase a home. Data file 504 may be a JSON data file from a second database within the financial system. The second database may store data associated with customers that may have taken a loan to purchase a car. Data file 502 may display a customer profile associated with a home loan. Data file 504 may display a customer profile associated with a car loan. Data files 502 and 504 may both include non-sensitive information and sensitive information.

The centralized data conversion API may be configured to mask all sensitive data to fictional data. The masked data may be shown at data file 518 and data file 520. Data file 518 may correspond to data file 502. Data file 520 may correspond to data file 504.

The data masking may be done dynamically. The data masking may be done as a static data masking.

In this example, data files 502 and 504 may include data associated with the same customer. The centralized data conversion API may be configured to determine that both 502 and 504 have the same value for the 'customer ID' and therefore may indicate that the same customer has both a home loan customer profile and a car loan customer profile.

The customer profile in both 502 and 504 may include a plurality of other fields. Some of the fields may be the same for both profiles. Some of the fields may be different. The fields that are the same for both profiles in 502 and 504 may be converted into identical fictional data strings. The 'customerID' field in 502 has a value of '185122229.' The 'customerID' field in 504 has the same value of '185122229.' Both sets of data for this customer have the field names 'FirstName', 'LastName', 'MiddleName', and 'CustomerID.' The value for each of the above field names in both sets of data are the same. This enables the data files to be consistent, accurate and in synchronization. This may reduce the chance of error on duplicates sets of data. This may enable eliminating duplicate fields when performing a test and/or an analysis.

Additionally, in this example, the same type of conversion algorithm may be performed on each of the sensitive data. The conversion algorithm performed for alpha characters may be the random-character type algorithm. For each numeric string of characters, the type of conversion algorithm executed may be the fixed-character conversion algorithm.

Furthermore, a selected number of characters within each string of sensitive characters may not be replaced in order to retain a level of meaning and intelligence to the data.

Home loan data file 502 may include a number of fields. Referenced fields 506 and 508 may each include a portion of data that may have some indication. Field name 'postalCode' may include the value of '02860' as shown at 506. When the 'postalCode' field is converted, the corresponding fictional data string 522 may include the value of '028XX.' The first 3 characters in this example are the same as the original string of characters. The first three characters '028' may correlate to the location of residence of the customer. The first 2 characters in the 'customerID' field 508 may include a value of '18'. This may correspond to the year the customer engaged with the financial institution. These first 2 characters may not be replaced in the converted string of characters as shown at 532 and may be revealed within the testing environment.

Auto loan data file 504 may also include a number of fields. Referenced fields 510, 512, 514 and 516 may each include a portion of data that may indicate significance. 'CustomerID' field 510 may be the same ID as 'CustomerID' 508 and the equivalent converted string 524 may be the same as converted string 532. Field 'DateofBirth' 512 may include a value of 'Mar. 6, 1976.' The conversion algorithm may replace most of the characters but may retain the year of birth, as shown at 526. This also may enhance the opportunity for realistic data without comprising on privacy.

Partial values from 'phonenumber' field 514 and 'socialsecurityno' field 516 may also be preserved as shown at converted fictional data strings 528 and 530. The first 3 digits of a phone number may also reveal a location of a customer. The first 3 digits of a social security number may also have significance with respect to the location of a customer at the time of his or her applying for the social security number. These characters may lend some intelligence to the data being tested and analyzed.

Retaining partial data from personal and private data without compromising security may increase the ability to at least partially replicate a production environment within a controlled test environment.

Thus, methods and apparatus for converting sensitive data within a centralized data conversion API have been provided. Persons skilled in the art will appreciate that the present invention can be practiced by other than the described embodiments, which are presented for purposes of illustration rather than of limitation. The present invention is limited only by the claims that follow.

What is claimed is:

1. One or more non-transitory computer-readable media storing computer-executable instructions which, when executed by a processor in a computerized device, perform a method for converting data within data files into secure data via a centralized application programming interface ("API"), the method comprising:
   retrieving the data files from two or more data repositories, the data files being configured for use in an external network, each data file comprising a user profile, each user profile comprising field names and associated value pairs, wherein each of the value pairs comprises non-sensitive data and sensitive data, the sensitive data comprising sensitive data strings, the sensitive data strings including a first sensitive data string and a second sensitive data string, and the non-sensitive data comprising one or more non-sensitive data strings;
   transmitting the data files to the centralized API;
   searching the data files for two or more user profiles associated with a user;
   identifying two user profiles associated with the user, wherein the two user profiles are matching user profiles;
   for the data files comprising the matching user profiles, synchronizing each of the sensitive data strings within the matching user profiles by:
      selecting a conversion algorithm from a plurality of conversion algorithms for the matching user profiles; and
      using the selected conversion algorithm, securing the data files comprising the matching user profiles by converting each of the sensitive data strings into fictional data, strings within the matching user profiles, the converting comprising:
         for the first sensitive data string, replacing each character in the first sensitive data string with a replacement character; and
         for the second sensitive data string;
            replacing a first sub-set of characters within the second sensitive data string with a third sub-set of characters; and
            maintaining a second sub-set of characters within the second sensitive data string; and
      following the converting, transmitting the data files comprising the matching user profiles to the external network; and
   for the data files comprising each non-matching user profile:
      determining, via the centralized API, a file-type for each the non-matching user profile within the data files;
      for each sensitive data string, selecting a conversion application from a plurality of conversion applications, each of the conversion applications supporting the file-type of each non-matching user profile within, the data files;
      for each sensitive data string within each non-matching user profile, converting each sensitive data string into a fictional data string based on the selected conversion application thereby securing the data files comprising the non-matching user profiles, the converting comprising:
         for the first sensitive data string, replacing each character in the first sensitive data string with a replacement character; and
         for the second sensitive data string:
            replacing a first sub-set of characters within the second sensitive data string with a third sub-set of characters; and
            maintaining a second sub-set of characters within the second sensitive data string; and
      following the converting, transmitting the data files comprising the non-matching user profiles to the external network.

2. The method of claim 1 wherein the retrieving the data files further comprises, retrieving from an internal network the data files.

3. The method of claim 2 wherein the transmitting to the external network further comprises, transmitting initially to an internal API of the internal network and then transmitting further from the internal API to the external network.

4. The method of claim 2 wherein, when the data files are retrieved from the data repositories, the method further comprises disassociating the data files from the internal network thereby preventing tracking a source of the retrieved data files.

5. The method of claim 4 wherein the disassociating comprises masking and deleting identifiers associated with the data files.

6. The method of claim 1 wherein the converting further comprises creating a unique string of characters for each of the sensitive data strings.

7. The method of claim 1 wherein the conversion algorithms comprise uses one or more of a hashing algorithm, shuffle algorithm, random number algorithm, fixed-character algorithm, fixed-numeric algorithm and masking algorithm.

8. The method of claim 1 wherein the second sub-set of characters is indicative of at least one of a user region, user birthplace and user gender.

9. The method of claim 1 wherein the sensitive data comprises one or more of a social security number, a credit-card number, a user's salary and a birth-date.

10. The method of claim 1 wherein the external network is a data-testing network.

11. The method of claim 1 wherein the external network is a data-analytics network.

12. A centralized data conversion architecture comprising non-transitory computer-readable media and a processor, the architecture utilizing computer-executable instructions stored on the media and executed by the processor for converting data into secure data via a centralized application programming interface ("API"), the centralized data conversion architecture comprising:
   one or more external networks in communication with an internal network via a communication, platform;
   a first firewall residing between the communication platform and one or more external platforms;
   a second firewall residing between the communication platform and the internal network, the internal network comprising:
   one or more internal APIs operating as a gateway to the centralized data conversion API for converting sensitive data to fictional data, the fictional data being transmitted to the external networks;
   two or more data repositories storing data associated with an entity of the internal network, the data is accessed via the one or more internal APIs, each data file comprising a user profile, each user profile comprising field names and associated value pairs, wherein each of the value pairs comprises non-sensitive data and sensitive data, the sensitive data comprising sensitive data strings, the sensitive data strings including a first sensitive data string and a second sensitive data string, and the non-sensitive data comprising one or more non-sensitive data strings; and wherein, prior to a transmission of data to one or more of the external networks, the one or more internal APIs are configured to, via the processor:
retrieve the data from the data repositories;
transmit the data to the centralized data conversion API, wherein the centralized data conversion API is configured to:
search the data files for two or more user profiles associated with a user;
identify two user profiles associated with the user, wherein the two user profiles are matching user profiles;
for the data files comprising the matching user profiles, synchronize each of the sensitive data strings within the matching user profiles by:
selecting a conversion algorithm from a plurality of conversion algorithms for the matching user profiles; and
using the selected conversion algorithm, securing the data files comprising the matching user profiles by converting each of the sensitive data strings into fictional da ta strings within the matching user profiles, the converting comprising:
for the first sensitive data stringy replacing each character in the first sensitive data string with a replacement character; and
for the second sensitive data string;
replacing a first sub-set of characters within the second sensitive data string with a third sub-set of characters; and
maintaining a second sub-set of characters within the second sensitive data string; and
following the converting, transmitting the data files comprising the matching user profiles to the external network; and
for the data files comprising each of a non-matching user profile, the centralized data conversion API is further configured to:
determine a file-type for each non-matching user profile within the data file;
for each non-matching riser profile, select a conversion application from a plurality of conversion applications that supports the file-type of the non-matching user profile;
using the selected conversion application, securing the data files comprising the non-matching user profiles by converting each of the sensitive data strings into fictional data strings within the non-matching user profile, the convening comprising:
for the first sensitive data string, replacing each character in the first sensitive data string with a replacement character; and
for the second sensitive data string, replacing a first sub-set of characters within the second sensitive data string with a third sub-set of characters, and maintaining a second sub-set of characters within the second sensitive data string; and
following the converting, transmit each non-matching user profile within the data file to the internal API; and
the internal API is further configured to transmit each non-matching user profile within the data file, via the communication platform, to the one or more external networks.

13. The architecture of claim 12 wherein the external networks are third-party networks that receive data for testing and/or analytics.

14. The architecture of claim 12 wherein the conversion application executes a conversion algorithm, the conversion algorithm comprising one or more of a hashing algorithm, shuffle algorithm, random number algorithm, fixed-character algorithm, fixed-numeric algorithm and masking algorithm.

15. The architecture of claim 12 wherein the second sub-set of characters from the sensitive data string is indicative of at least one of a user region, user birthplace and user gender.

16. The architecture of claim 12 wherein the converting further comprises, creating a unique string of characters for each fictional data string.

17. The architecture of claim 12 wherein the sensitive data comprises one or more of a social security number, a credit-card number, a user's salary and a birth-date.

18. The architecture of claim 12 wherein, when the one or more internal APIs retrieve the data from the data repositories, the one or more internal APIs are further configured to disassociate the data from the internal network thereby preventing tracking a source of the retrieved data.

19. The architecture of claim 18 wherein the one or more internal APIs are further configured to mask and delete personal identifiers associated with the data.

* * * * *